Nov. 9, 1926.
E. H. W. FOOT
1,606,623
ROTARY TILLING MACHINE
Filed July 28, 1924    2 Sheets-Sheet 1
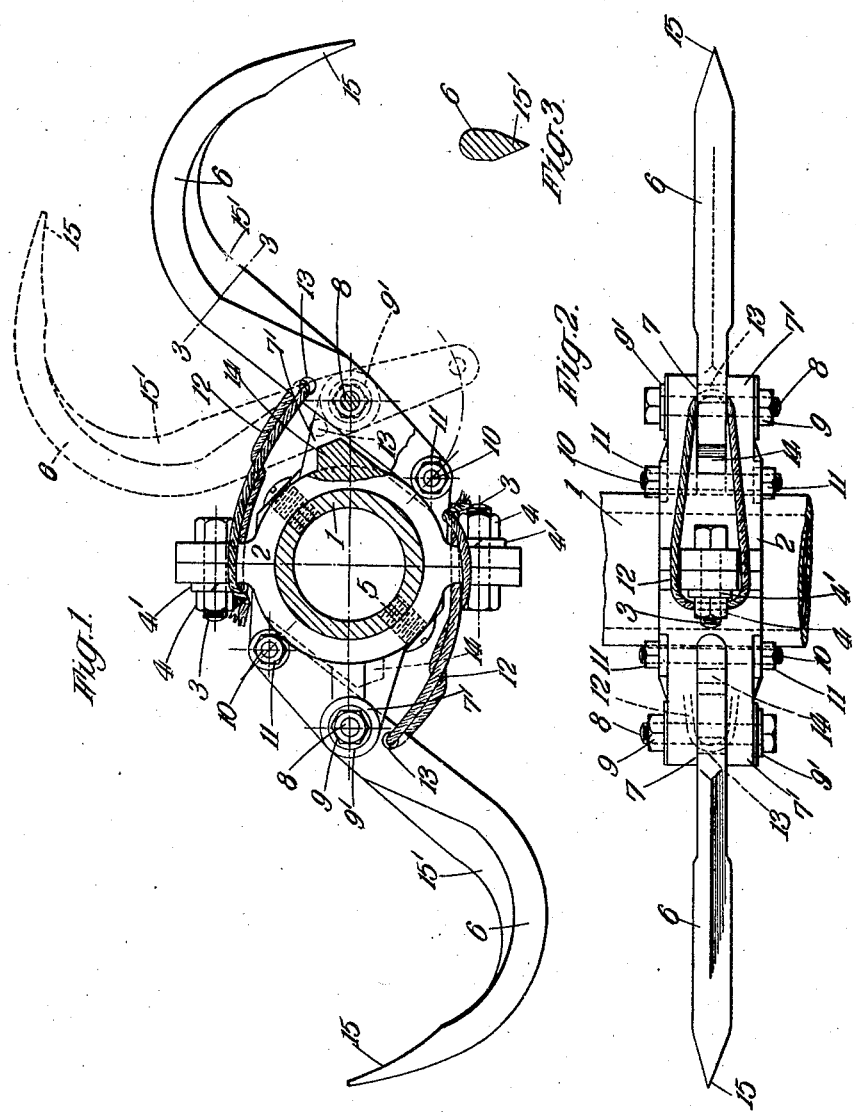
Inventor
Edwood H. W. Foot
By
[signature]
Attorney.

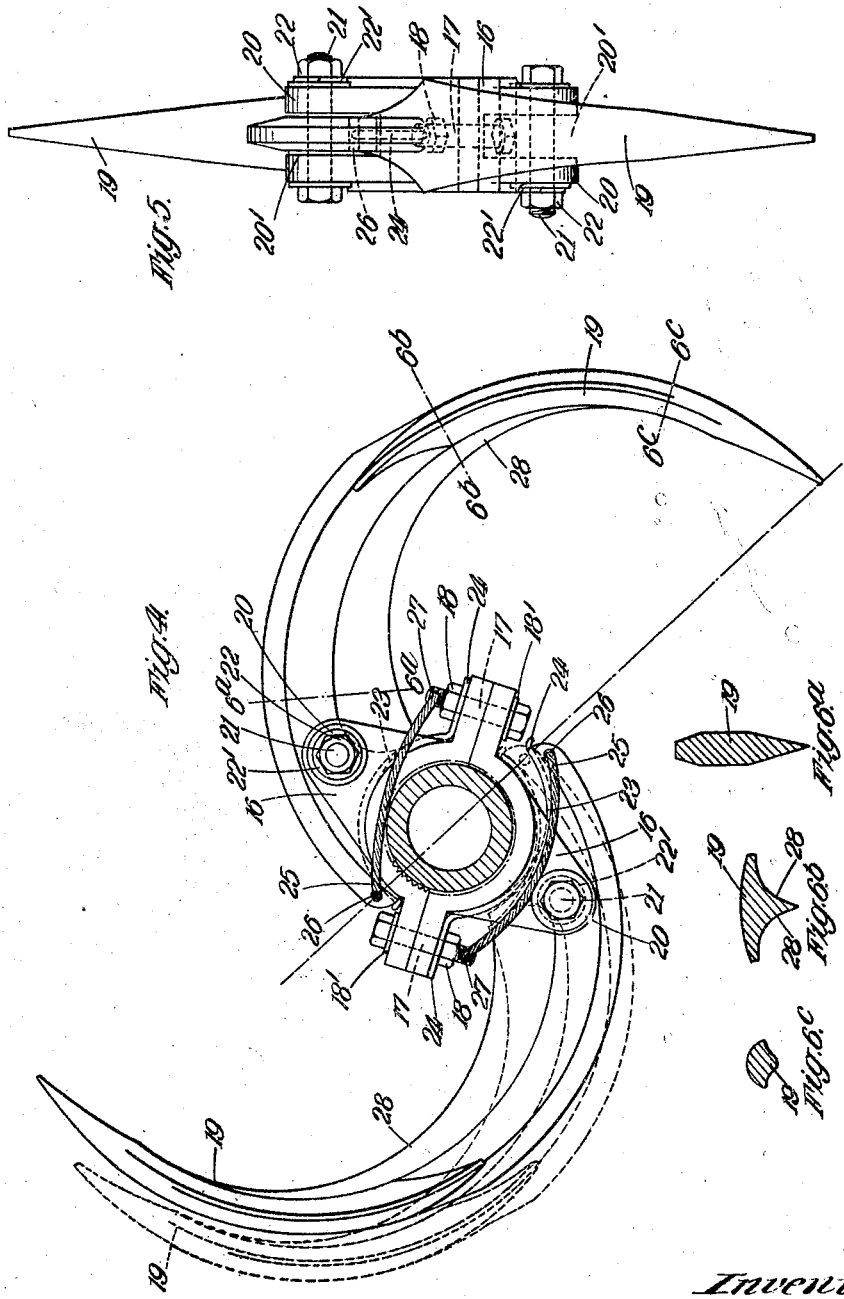

Patented Nov. 9, 1926.

1,606,623

UNITED STATES PATENT OFFICE.

EDWARD HAMMOND WHALLEY FOOT, OF SPALDING, ENGLAND.

ROTARY TILLING MACHINE.

Application filed July 28, 1924, Serial No. 728,758, and in Great Britain December 29, 1923.

The invention relates to rotary tilling machines and consists in improvements by which the work of cutting the soil is reduced and the construction of the machines simplified.

In machines of this character, as usually constructed the picking or hoeing arms are mounted on a rotary shaft, driven by gearing from a motor or other source of power, which also propels the vehicle by which the machine is carried, and the arms are spring supported or pivoted so as to allow them to yield when encountering any obstructions in the ground. The necessary movement permitted to the arms involves a tearing action of the soil which requires the expenditure of considerable power.

By the present invention a clean hoeing action in the soil, as opposed to the tearing action obtained by elastically supported picking arms is obtained.

The accompanying drawings represent examples of rotary tines according to the invention.

Fig. 1 is an elevation showing one method of securing the tines to the shaft. Fig. 2 is a plan view and Fig. 3 is a section on the line 3—3 of Fig. 1.

Fig. 4 is an elevation and Fig. 5 an end view of a modified construction and Figs. $6^a$, $6^b$, $6^c$ are sections, respectively, on the lines $6^a$—$6^a$ $6^b$—$6^b$ and $6^c$—$6^c$ of Fig. 4.

Referring to Figs. 1–3, 1 is a hollow driving shaft, 2 a bracket made in two parts, secured together by bolts 3, nuts 4 and washers 4′ and fastened to the shaft 1 by screws 5.

The numeral 6 indicates the tines, of which any required number may be arranged along the length of the shaft and in any preferred, such as staggered or helical, order, two tines being shown in the example illustrated in the same transverse plane.

The tines are inserted in slots 7 provided in projecting lugs 7′ of the bracket 2 and are mounted on pivot bolts 8 secured by nuts 9 and washers 9′.

Inner extensions of the tines are mounted on safety bolts 10 inserted in holes provided in the bracket 2 and secured by nuts 11.

Should any abnormal stress be exerted on a tine, the bolt 10, which is of smaller diameter than the pivot bolt 8 and is at the shorter arm of the lever fulcrumed at 8, would be sheared.

When this occurs the back of the tine rests against a shoulder 14 provided on the bracket and so disposed that it forms a new fulcrum very close to the pivot pin 8, which, under the increased leverage of the reaction due to the resistance encountered, may also be sheared.

Should this occur, the time is prevented from flying off from the bracket by a short length of rope or wire 12 passed through a hole 13 in the tine and a hole in the bracket 2.

Each tine is formed with a long conical picking point 15, a cutting portion $15^1$ of wedge-shaped cross section as shown in Fig. 3, gradually increasing in depth, and adapted to throw on either side the excavated clod, the angle of the cutting edge becoming progressively more obtuse on either side of the section 3—3 Fig. 1, the shank, as shown in Fig. 2, being narrower than the blade portion.

In the modification shown in Figs. 4–$6^c$, the bracket 16 is made, as in the example described above, in two parts secured together by bolts 17, nuts 18 and washers 18′. The engaging surfaces of the shaft and bracket are complementally grooved to provide increased resistance to relative rotational displacement.

The tines 19 are inserted, as in the previously described example, in slots 20′ of projecting lugs 20 of the bracket 16 and are mounted on pivot bolts 21, secured by nuts 22 and washers 22′. The bracket in this case is formed substantially as a split sleeve with projecting lugs and the inner portions 23 of the shanks of the tines are formed as arcs of circles concentric with the periphery of the bracket and acting as fulcrums resisting the reactions due to the tilling stresses.

A leaf spring 24, one end of which is secured to the bracket by one of the nuts 18, is inserted when required between the inner end of each tine and the bracket. During the time in which the tine is in contact with the soil the spring is compressed as shown by the upper part of Fig. 4, but when the tine leaves the soil it is rapidly vibrated under the action of the spring from the position shown by the broken lines in the lower part of the figure to the position shown by the full lines. This rapid vibration has the effect of breaking up the severed clod of earth cut off by the tine.

Should the resistance encountered in the soil by any tine be excessive, the bolt 21 will be sheared, but can be easily replaced. Wires 25 passed through holes 26 and 27 formed respectively, in the tines and in the bolts 17, prevent the sheared tines from being projected from the machine.

Cross sections of a tine are shown in Figs. 6ª, 6ᵇ, 6ᶜ, the faces of the cutting edges being indicated at 28 in Fig. 6ᵇ, the concave surfaces acting as shovels to eject the excavated clods on either side. The path of the end of the cutting edge of the tine is approximately cycloidal at the normal speed of progression of the machine and the curvature is increased towards the root of the tine.

Having thus described the nature of the said invention and the best means I know of carrying the same into practical effect, I claim:—

In a rotary tiller embodying a driving shaft, a plurality of tines carried by said shaft, each tine comprising a comparatively long conical picking point succeeded by a curved cutting portion of wedge-shaped cross section and gradually increasing depth adapted to throw on either side the excavated clod, and finally succeeded by a narrowed shank.

In testimony whereof I have signed my name to this specification.

EDWARD HAMMOND WHALLEY FOOT.